United States Patent [19]

Lee et al.

[11] 4,131,830

[45] Dec. 26, 1978

[54] POSITION CONTROL AND OBSTRUCTION DETECTOR APPARATUS FOR A MOTOR-DRIVEN DOOR OPERATOR

[75] Inventors: Maw H. Lee; Barry V. Prehodka, both of Cincinnati, Ohio

[73] Assignee: Clopay Corporation, Cincinnati, Ohio

[21] Appl. No.: 876,004

[22] Filed: Feb. 8, 1978

[51] Int. Cl.[2] .......... H02P 1/00; H02P 3/00

[52] U.S. Cl. .......... 318/266; 49/28; 49/199; 49/139; 318/469

[58] Field of Search .......... 49/28, 199, 197, 200, 49/139, 140, 360, 362; 160/188-190; 318/466-469, 266, 267, 475

[56] References Cited

U.S. PATENT DOCUMENTS

| | | | |
|---|---|---|---|
| 1,686,851 | 10/1928 | Gorman | 318/266 |
| 2,387,533 | 10/1945 | Schmucker | 318/475 X |
| 2,568,808 | 9/1951 | Johanson | 49/28 X |
| 2,751,219 | 6/1956 | Dodge | 49/28 X |
| 2,822,166 | 2/1958 | Herbert | 49/199 |
| 2,882,044 | 4/1959 | Ginte | 160/189 X |
| 2,883,182 | 4/1959 | Bornemann | 160/188 UX |
| 3,078,407 | 2/1963 | Schaefer | 49/28 X |
| 3,764,875 | 10/1973 | Harris | 318/266 |
| 3,955,661 | 5/1976 | Popper et al. | 49/28 X |
| 3,996,697 | 12/1976 | Bailey et al. | 49/28 |

*Primary Examiner*—Philip C. Kannan
*Attorney, Agent, or Firm*—Wood, Herron & Evans

[57] ABSTRACT

An improved position control apparatus is disclosed to control a motor-driven door operator to halt movement of a door at an open position and a closed position. The position control apparatus includes a control screw means in the form of a threaded shaft extension of the motor shaft or a threaded rod coupled to the motor shaft which is rotated when the motor is energized. A travel nut is threadedly engaged with the control screw means and is constrained against rotational motion so as to reciprocate along the control screw means. Position detection means, such as switches, are disposed near the control screw means for actuation by the travel nut to control the motor as the door approaches the open position and the closed position. In another embodiment, a toggle switch is mounted on the travel nut, and the switches are replaced by stops for actuation of the toggle switch to control the motor. An improved obstruction detector apparatus is also provided to control the motor if an obstruction is encountered as the door moves between the open position and the closed position. The obstruction detector apparatus includes a safety switch which is actuable by rotation of the motor casing due to reaction torque, if an obstruction is encountered as the door moves in one direction, and a lever that is actuable by rotation of the motor casing, if an obstruction is encountered as the door moves in an opposite direction, to actuate the safety switch.

28 Claims, 12 Drawing Figures

POSITION CONTROL AND OBSTRUCTION DETECTOR APPARATUS FOR A MOTOR-DRIVEN DOOR OPERATOR

BACKGROUND OF THE INVENTION

This invention relates to door operators which move a door between an open position and a closed position and which stop or reverse movement of the door in response to an obstruction that is encountered during movement of the door between the open and closed positions. Specifically, this invention relates to an improved position control apparatus to control the door operator motor when the door approaches the open position and the closed position and relates to improved obstruction detector apparatus to stop or reverse the motor if an obstruction is encountered as the door moves between the open and closed positions.

The prior art includes three broad approaches to provide control for a door operator motor as the door approaches the open position and the closed position. One approach is to place limit switches in the path of movement of the door or the linkage which connects the door to the operator as shown in U.S. Patent 1,215,573. One of the limit switches is actuated as the door approaches the open position and the closed position. When either limit switch is actuated, the motor is de-energized. A second approach is to sense resistance to further movement of the door as the door reaches the limits of the rails which support the door at the open position or the closed position as shown in U.S. Patent 2,883,182. When resistance to further movement is sensed, the motor is deenergized. A combination of these two approaches is found in U.S. Patent 2,568,808 which includes a limit switch to control the motor as the door approaches the open position and a means to sense resistance to further movement as the door reaches the closed position to control the motor. The third approach is a mechanical analog for movement of the door, such as shown in U.S. Patent 1,686,851 which discloses a position control screw that drives a traveling body along a path in contact with strips which are adjustable to set the open and closed positions. When the traveling body is driven out of contact with either of the strips, the motor is de-energized.

In U.S. Patent 1,686,851, as well as more recent prior art, such as U.S. Patent 3,996,697, the position control screw is driven through a mechanical linkage, such as a gear or pulley speed reduction apparatus. The complexity of this apparatus, such as the number of elements, as well as the assembly time, for such position control apparatus renders these door operators relatively expensive. Also in this category is U.S. Patent 3,955,661 which includes a speed reduction ball drive assembly through which the position control screw is driven. Perhaps the most direct prior art approach is shown in U.S. Patent 3,078,407 which includes travel nuts on the drive screw for a door operator. Nevertheless, because no apparent speed reduction is provided between the drive screw and the position control screw in U.S. Patent 3,078,407, since they are one in the same, the travel of the travel nuts must be over a substantial distance or else a portion of the drive screw must be finely threaded so as to require a high quality, high strength material over the entire length of the drive screw which is relatively expensive. Moreover, disconnection of the drive screw from the door operator motor to facilitate packing or shipping would be inconvenient due to difficulty of installation of the door operator because of realignment of the integral position control and drive screw with the associated position control switches. Furthermore, the integral position control and drive screw could be bowed due to misalignment during installation and is subjected to forces which cause bowing during operation. This results in binding of the travel nuts on the finely threaded position control screw portion so as to produce metal dust which fouls or abrades the threads of the travel nuts so that the travel nuts break or wear out.

Safety considerations require that the door operator motor also be de-energized, or reversed, if an obstruction is encountered by the door as the door is moved in either direction between the open and closed positions. The prior art includes various approaches to detect an obstruction, such as a person or automobile, in the path of the door. As a safety precaution, the motor is either stopped or reversed when an obstruction is encountered to prevent injury or damage.

One approach to detect an obstruction is to sense the reaction torque upon the door operator motor by rotation of a rotatably mounted motor casing, such as shown in U.S. Patents 3,764,875 and 3,787,725. See, also, U.S. Patent 2,387,533. The door operator in U.S. Patent 3,764,875 includes a complex mechanical linkage to sense rotation of the motor casing so as to actuate a safety switch if the door hits an obstruction during closing. On the other hand, the door operator in U.S. Patent 3,787,725 includes two safety switches which are provided to sense rotation of the motor casing if the door encounters an obstruction during opening or closing. The complex mechanical linkage or plurality of safety switches in prior art door operators makes them difficult to assemble and expensive.

SUMMARY OF THE INVENTION

In accordance with the present invention, an improved position control apparatus is provided to control the door operator motor as the door approaches the open position and the closed position. In one embodiment, the position control apparatus includes a control screw means in the form of a threaded shaft extension of the motor shaft. A travel nut is threadedly engaged with the threaded shaft extension. The travel nut is constrained against sympathetic rotational motion with the threaded shaft extension and, therefore, reciprocates along the threaded shaft extension as the threaded shaft extension is rotated by the motor. Position detection means, preferably in the form of switches which are adjustable to set the open and closed positions for the door, are disposed near the threaded shaft extension for actuation by the travel nut as the travel nut reciprocates along the threaded shaft extension to control the motor. In a modified form, the control screw means is in the form of a threaded rod coupled to the motor shaft. In a second embodiment, a toggle switch is mounted on the travel nut and moves with the travel nut along the control screw means for actuation by adjustable stops which are substituted for the switches to control the motor.

An improved obstruction detector apparatus is also provided to sense rotation of a rotatably mounted motor casing due to reaction torque when an obstruction is encountered as the door moves between the open position and the closed position in either direction. The obstruction detector apparatus includes a single rotation sensor means, preferably a switch, mounted to sense rotation of the motor casing in one direction and a pivotally mounted lever which is pivoted against the same switch when the motor casing rotates in the opposite direction to control the motor.

Consequently, while various proposals for position control apparatus that includes a position control screw and travel nut render prior art door operators relatively expensive and difficult to assemble and disassemble, one aspect of the present invention relates to an improved position control apparatus of the type which includes a position control screw and travel nut that provides a simple and economical apparatus and facilitates assembly and disassembly of the door operator. Also, as another aspect of the present invention, an improved obstruction detector apparatus is provided to alleviate the need for a complex mechanical linkage or two safety switches so as to provide a more economical obstruction detector apparatus for a door operator.

BRIEF DESCRIPTION OF THE DRAWING

The present invention will be better understood by reference to the drawing accompanied by the description which appears below. With reference to the drawing:

Referring now to the drawing, FIG. 1 shows a door operator 10 in accordance with the present invention. The door operator 10 is shown in a typical environment wherein the door operator 10 is attached to a ceiling 11 in position to move a door 12 in either direction between a closed position, as shown in FIG. 1, wherein the door 12 covers the portal between the header 13 and the floor 14 of a structure, such as a garage, and an open position (not shown) wherein the door 12 is moved to an overhead position in which the door 12 is generally parallel to the floor 14.

Figure 1:
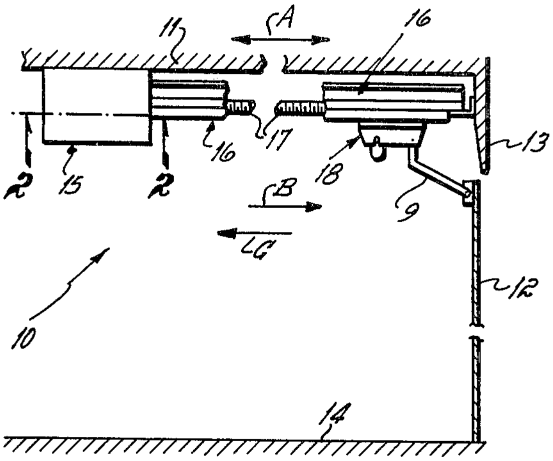
FIG. 1 is an elevational view of a door operator which incorporates the features of the present invention.

The door 12 is mounted at each side by rollers which are disposed in door rails which parallel the door as is well known. The apparatus that is employed to mount the door 12 forms no part of the present invention. The operator 10 includes a housing 15, an elongated track 16, a screw 17, a shuttle 18 and a bracket 9 which attaches the door 12 to the shuttle 18.

Figure 6:
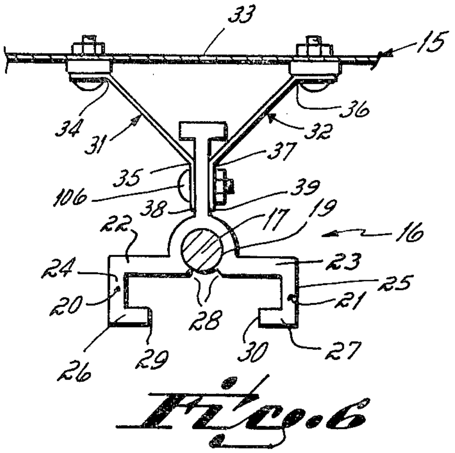
FIG. 6 is a cross-sectional view taken along line 6—6 of FIG. 2.
Figure 8:
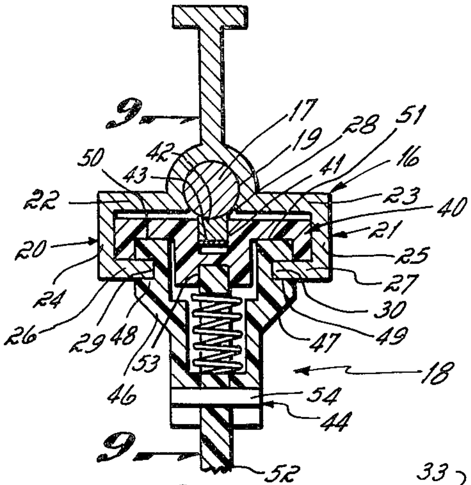
FIG. 8 is a cross-sectional view taken along line 8—8 of FIG. 7.

The cross-sectional configuration of the track 16 is shown in FIGS. 6 and 8. The track 16 includes an arcuate screw channel 19 in which the screw 17 is disposed for rotational motion with respect to the track 16. The track 16 further includes opposed U-shaped channels 20 and 21 which comprise upper flanges 22 and 23, depending vertical legs 24 and 25 and lower flanges 26 and 27, respectively.

The screw channel 19 communicates with the region as defined by the U-shaped channels 20 and 21 through a first elongated slot 28. The lower flanges 26 and 27 have respective ends 29 and 30 which define a second slot therebetween along the lower portion of the track 16.

As shown in FIG. 6, the upper cross-section of the track 16 is T-shaped so that the track 16 may be secured to a plate 33 of the housing 15 by means of brackets 31 and 32. The brackets 31 and 32 preferably have 132° bends at 34, 35, 36 and 37. The 132° bends provide sufficient clearance between the respective ends 38 and 39 of the brackets 31 and 32 so that the track 16 can be forced between the ends 38 and 39 of the brackets 31 and 32. Thereafter, a bolt and nut 106 is extended through aligned holes in the brackets 31 and 32 and the track 16 and tightened, and the 132° bends are expanded to 135° as the ends 38 and 39 of the brackets 31 and 32 are brought into contact with the track 16.

Figure 7:
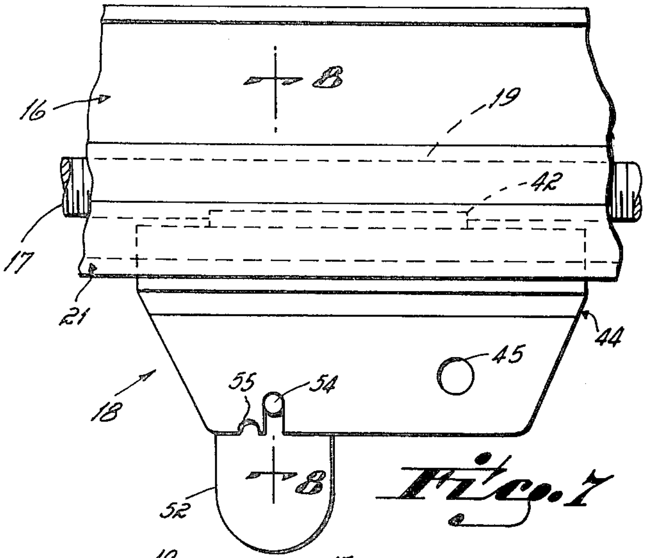
FIG. 7 is an elevational view of a shuttle and track.
Figure 9:
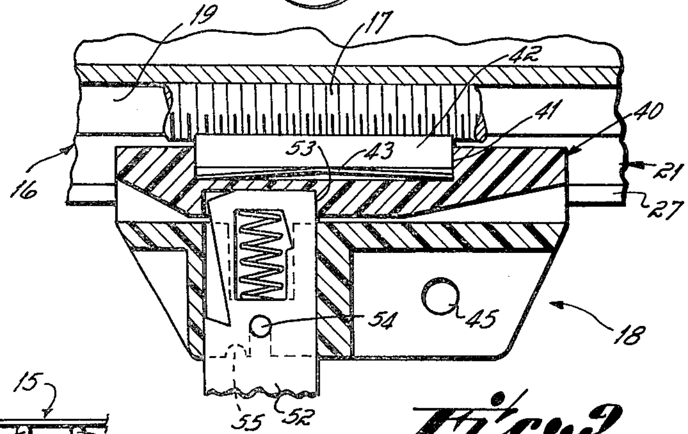
FIG. 9 is a cross-sectional view taken along line 9—9 of FIG. 8.

The shuttle 18 preferably comprises a two-piece shuttle such as that shown by way of illustration in FIGS. 7–9. The shuttle 18 includes a screw-driven traveler 40 which is disposed within the U-shaped channels 20 and 21. The screw-driven traveler 40 incorporates a first recess 41 with a quarter nut 42 therein. The nut 42, as shown in FIGS. 8 and 9, is preferably urged into operative engagement with the screw 17 by means of a leaf spring 43. Consequently, as the screw 17 rotates, the screw-driven traveler 40 is driven within the U-shaped channels 20 and 21 of the track 16 by virtue of engagement of the nut 42 with the screw 17. The direction of travel of the screw-driven traveler 40 is parallel to the longitudinal axis of the screw 17 in the reciprocal directions indicated by the double arrow A in FIG. 1.

The shuttle 18 also includes a coupling traveler 44 to which the bracket 9 is connected via an aperture 45 in the coupling traveler 44. The coupling traveler 44 has upstanding legs 46 and 47. The legs 46 and 47 are provided with respective slots 48 and 49 in which are received the ends 29 and 30 of the lower flanges 26 and 27 of the U-shaped channels 20 and 21, respectively. Consequently, the coupling traveler 44 is slidably mounted on the lower flanges of the U-shaped channels 20 and 21 of the track 16.

As shown in FIG. 8, the screw-driven traveler 40 is provided with longitudinal grooves 50 and 51 which receive the upper ends of the legs 46 and 47 of the coupling traveler 44. Consequently, when the screw-driven traveler 40 and the coupling traveler 44 are disposed at the same point along the track 16, the legs 46 and 47 of the coupling traveler 44 simply slide within the grooves 50 and 51 of the screw-driven traveler 40 in noninterfering relationship.

In order to operatively connect the coupling traveler 44 to the screw 17 so that the door 12 may be opened and closed, the coupling traveler 44 incorporates a spring-loaded latch 52. As shown in FIG. 9, the latch 52 is in the extended, or coupled, position to couple the coupling traveler 44 to the screw-driven traveler 40 via a second recess 53 in the screw-driven traveler 40. As can be seen in FIG. 9, the latch 52 is pulled downwardly and rearwardly so that the retention pin 54 is rotated to reside within the detent 55 to uncouple the coupling traveler 44 and the screw-driven traveler 40. This disengages the coupling traveler 44 from the screw 17 and permits the door 12 to be opened or closed independently of the screw 17. In this mode of operation, the coupling traveler 44 continues to slide along the track 16 as the door is opened or closed. Further details of the two-piece shuttle as described may be found in a copending patent application, U.S. Serial No. 833,821, filed September 16, 1977, entitled "Improved Traveler Apparatus for Screw-Drive Closure Operator", assigned to the assignee of this application by named inventors Maw H. Lee and Barry V. Prehodka.

Figure 2:
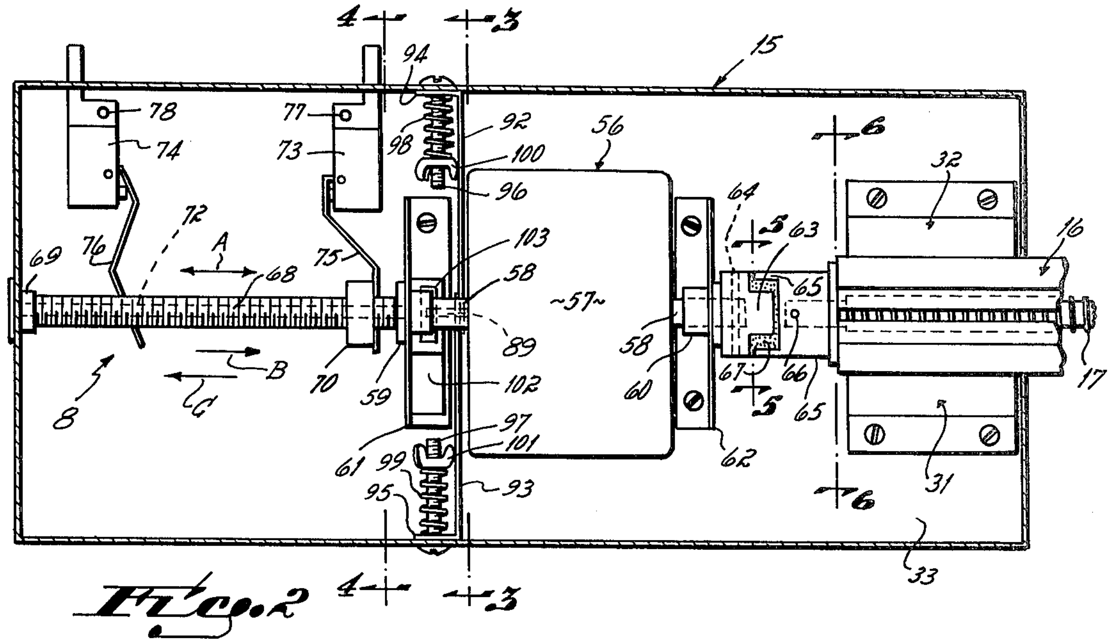
FIG. 2 is a bottom cutaway view taken along line 2—2 of FIG. 1 so as to show one embodiment of the improved position control apparatus in accordance with the present invention.

With reference now to FIG. 2, the housing 15 is shown to include an alternating current induction motor 56. The motor 56 includes a field winding which is mounted in a motor casing 57. The motor 56 also includes a rotor which is mounted on a motor shaft 58. The motor shaft 58 is journaled in bearings 59 and 60 which are mounted in support brackets 61 and 62, respectively, secured to the plate 33 of the housing 15. The field winding the motor casing 57 are rotatably supported by the motor shaft 58 by means of motor bearings (not shown).

Figure 5:
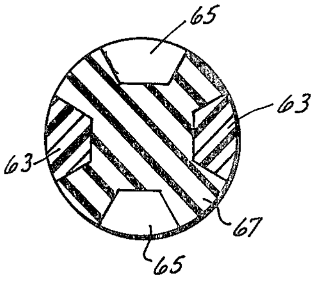
FIG. 5 is a cross-sectional view taken along line 5—5 of FIG. 2.

As shown in FIG. 2, the motor shaft 58 has a first coupler section 63 secured thereto by means of a pin 64. Similarly, the screw 17 has a second coupler section 65 secured thereto by means of a pin 66. As shown in FIGS. 2 and 5, a spider 67 of resilient material is incorporated to interengage the coupler sections 63 and 65. Incorporation of the coupler sections 63 and 65 and the spider 67 enables the motor shaft 58 to be effectively connected to drive the screw 17 notwithstanding slight misalignment between the motor shaft 58 and the screw 17. This facilitates disassembly of the door operator 10 so that the housing 15 and its constituent elements can be packed and shipped separately from the track 16, screw 17, shuttle 18 and bracket 9 and then assembled at the installation site.

In accordance with a first embodiment of the position control apparatus in accordance with the present invention, the motor shaft 58 is provided with a control screw means 8 which comprises a threaded shaft extension 68 of the motor shaft 58 on the opposite side of the motor 56 from the screw 17 as viewed in FIG. 2. The threaded shaft extension 68 is journaled at one end in a bearing 59 and at the other end by a bearing 69 supported by the housing 15. As shown in FIG. 2, the threaded shaft extension 68 includes substantially finer threads than the screw 17.

Figure 4:
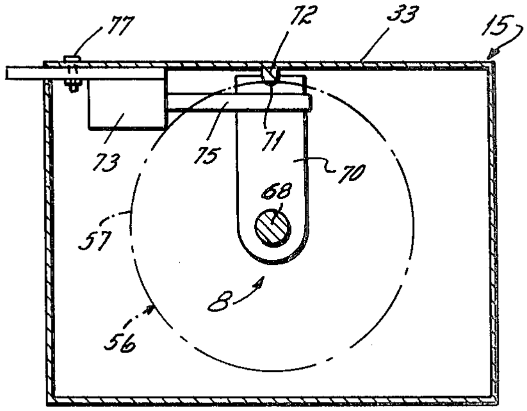
FIG. 4 is a cross-sectional view taken along line 4—4 of FIG. 2.
Figure 12:
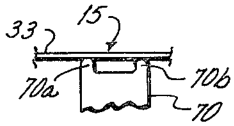
FIG. 12 shows a partial view of a modified form of the improved position control apparatus in FIGS. 2 and 11.

The position control apparatus in FIG. 2 in accordance with the present invention also includes a travel nut 70 which is threadedly engaged with the threaded shaft extension 68. As shown in FIGS. 2 and 4, the travel nut 70 is preferably provided with a groove 71 which slidably cooperates with a rib 72 that is secured to the housing 15. This constrains the travel nut 70 against sympathetic rotational motion. As shown in FIG. 12, however, the rib 72 can be eliminated, and bearing surfaces **70*a* and 70*b* may be formed on the travel nut 70 in slidable contact with the housing 15 so as to prevent sympathetic rotational motion of the travel nut 70. Consequently, as the motor 56 rotates the threaded shaft extension 68, the travel nut 70 reciprocates along the threaded shaft extension 68 in one of the directions indicated by the double arrow A in FIG. 2**.

In accordance with the embodiment of the position control apparatus of the present invention in FIG. 2, first and second position detection means, such as microswitches 73 and 74, are disposed near the threaded shaft extension 68. The microswitches 73 and 74 have respective switch arms 75 and 76 disposed in the path of movement of the travel nut 70 as the travel nut reciprocates along the threaded shaft extension 68. The microswitches 73 and 74 are preferably pivotally mounted, as at 77 and 78, to the housing 15 so that the positions of the switch arms 75 and 76 with respect to the ends of the threaded shaft extension 68 can be adjusted.

With reference to FIGS. 1 and 2, as the motor 56 rotates the screw 17 to drive the shuttle 18 to open and close the door 12, the threaded shaft extension 68 is also rotated so that the travel nut 70 reciprocates along the threaded shaft extension 68. Consequently, as the door 12 is closed, the shuttle 18 and the travel nut 70 move in the direction which is indicated by the arrow B in FIGS. 1 and 2. Similarly, as the door 12 is driven toward the open position, the shuttle 18 and the travel nut 70 move in the direction of the arrow C in FIGS. 1 and 2.

The first and second position detection means, such as the microswitches 73 and 74, are pivotally adjusted with respect to the respective ends of the threaded shaft extension 68 to set the closed and open positions of the door 12, respectively. That is, the microswitch 73 is pivoted about the pivot 77 so that the switch arm 75 is adjustably positioned with respect to the threaded shaft extension 68 such that the travel nut 70 actuates the microswitch 73 as the bottom of the door 12 nears the floor 14. Also, the microswitch 74 is pivoted about the pivot 78 so that the switch arm 76 is adjustably positioned with respect to the threaded shaft extension 68 such that the travel nut 70 actuates the microswitch 74 as the door 12 nears the open position. As such, the position control apparatus 68, 70, 72, 73 and 74 provides a mechanical analog for operation of the track 16, screw 17, shuttle 18, bracket 9 and door 12 as the motor 56 drives the door 12 between the open and closed positions. The microswitches 73 and 74 are connected to a circuit to control energization of the motor 56 as the door 12 nears the open and closed positions as desired, such as to de-energize the motor 56.

As can be seen, the embodiment of the position control apparatus of the present invention in FIG. 2 does not require a gear, pulley or ball drive speed reduction apparatus. Moreover, the screw 17 and the threaded shaft extension 68 are separate, and, consequently, the screw 17 can be of a lesser quality material since fine threads are not provided thereon. Consequently, the embodiment in FIG. 2 provides an economical position control apparatus for a door operator.

Figure 10:
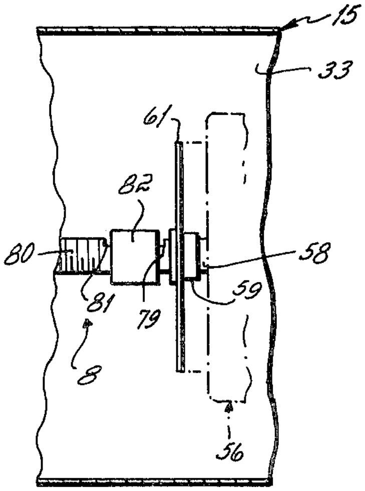
FIG. 10 shows a partial view of a modified form of the improved position control apparatus of FIG. 2.

In accordance with a modification of the position control apparatus in FIG. 2, the control screw means 8 may comprise a threaded rod 80 coupled to the motor shaft 58 as shown in FIG. 10. As shown in FIG. 10, the motor shaft 58 is ground to provide a flat 79, and a separate threaded rod 80 is also provided with a flat 81 at one end. The end of the threaded rod 80 that has the flat 81 is coupled to the motor shaft 58 by means of a coupler 82, and the other end of the threaded rod 80 is journaled, as in the bearing 69 of FIG. 2. The operation of the position control apparatus in FIG. 2, as modified in FIG. 10, is the same as already described.

Figure 11:
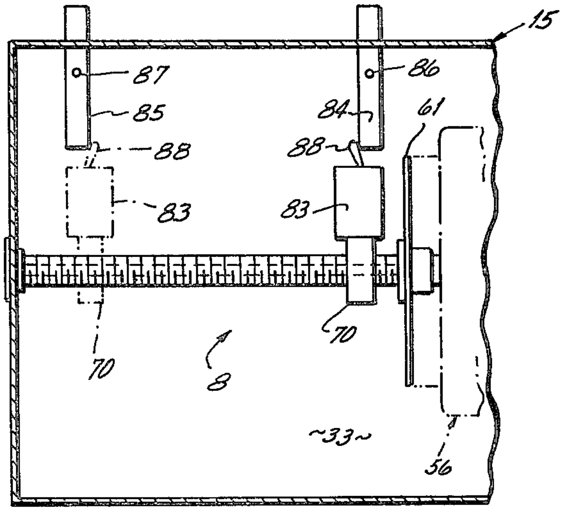
FIG. 11 shows a second embodiment of the position control apparatus in accordance with the present invention.

A second embodiment of the position control apparatus in accordance with the present invention is shown in FIG. 11. As shown in FIG. 11, the second embodiment includes a control screw means 8, such as the threaded shaft extension 68 in FIG. 2 or, as modified, the threaded rod 80 in FIG. 10, and the travel nut 70. A single-pole, double-throw toggle switch 83 is mounted on the travel nut 70 so that the toggle switch 83 reciprocates along the control screw means 8 with the travel nut 70. First and second position detection means, such as stops 84 and 85, are pivotally mounted, as at 86 and 87, to the housing 15. The positions of the stops 84 and 85 with respect to the ends of the control screw means 8 are adjusted for actuation of the switch arm 88 of the toggle switch 83 at the closed and open positions of the door 12, respectively.

In operation, as the door 12 nears the closed position, the switch arm 88 of the toggle switch 83 contacts the stop 84 so that the switch arm 88 is moved to the position that is indicated in solid lines in FIG. 11. As the door 12 nears the open position, the stop 85 moves the switch arm 88 to the position which is indicated in dotted lines in FIG. 11. The toggle switch 83 is connected to a circuit to control energization of the motor 56 as desired, such as to de-energize the motor 56.

Although the position control apparatus of the present invention provides control for the de-energization of the motor 56 as the door 12 nears the open and closed positions, safety considerations require that the motor 56 also be controlled if an obstruction is encountered by the door 12 as the door 12 moves between the open and closed positions. If an obstruction is encountered, movement of the door 12 is arrested, and an obstructive force is transferred through the bracket 9 to the shuttle 18 and prevents the shuttle 18 from being driven by the screw 17. Consequently, the screw 17 is prevented from rotating. Since the screw 17 is coupled to the motor shaft 58 of the motor 56, a stalled motor condition results and the motor 56 attempts to supply the additional torque required to move the door 12.

Figure 3:
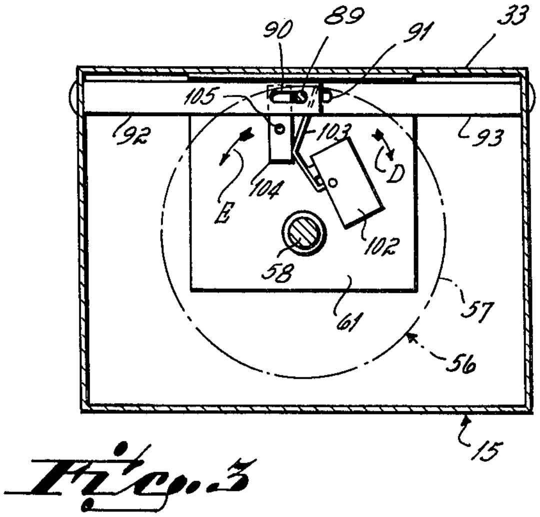
FIG. 3 is a cross-sectional view taken along line 3—3 of FIG. 2 so as to show an embodiment of the improved obstruction detector apparatus in accordance with the present invention.

As described eariler in connection with FIG. 2, the motor casing 57 is rotatably mounted. As shown in FIGS. 2 and 3, a motor casing bolt 89 is disposed within slots 90 and 91 in brackets 92 and 93, respectively. The brackets 92 and 93 are disposed on opposite sides of the bolt 89. Each bracket 92 and 93 includes a flanged portion 94 and 95, respectively, through which a respective bolt 96 and 97 extends to mount each bracket 92 and 93 to the housing 15. Respective springs 98 and 99 are captured between the respective flanged portions 94 and 95 of the brackets 92 and 93 and a respective nut 100 and 101 on the end of the respective bolts 96 and 97. Consequently, as shown in FIGS. 2 and 3, the brackets 92 and 93 exert opposing spring-loaded forces on the bolt 89 to resist rotation of the motor casing 57.

The nuts 100 and 101 are adjusted to set the compression of the springs 98 and 99, respectively, so that the reaction torque on the motor 56 that is produced by normal operation to move the door 12 between the open and closed positions is not sufficient to cause rotation of the motor casing 57. When an obstruction causes the motor 56 to supply additional torque, however, the reaction torque that is produced is sufficient to overcome the yieldable, spring-loaded forces so that the motor casing 57 rotates in one direction or the other.

In accordance with the preferred embodiment of the obstruction detector apparatus of the present invention, a motor casing rotation sensor means, such as a microswitch 102 with a switch arm 103, is actuated by the bolt 89 when the motor casing 57 rotates in a first direction as indicated by the arrow D in FIG. 3. Also, a means, or lever, 104 which is pivotally mounted at 105 to the support bracket 61 is provided so that the bolt 89 pivots the lever 104 against the switch arm 103 to actuate the microswitch 102 when the motor casing 57 rotates in a second direction as indicated by the arrow E in FIG. 3. The microswitch 102 can be connected to a circuit to control energization of the motor 56 as desired, such as to de-energize or reverse the motor 56.

The obstruction detector apparatus in accordance with the preferred embodiment of the present invention requires only a single switch. Furthermore, the amount of wire and assembly time is reduced so as to provide an economical obstruction detector apparatus for a door operator.

The above and other advantages and modifications will become readily apparent to one of ordinary skill in the art without departure from the scope of the present invention, and applicants intend to be bound only by the appended claims.

We claim:

1. In an operator for driving a load, said operator including a drive means connectable to said load for moving said load between a first position and a second position, a selectively energizable motor having a motor shaft coupled at one end to said drive means for actuating said drive means to move said load, and position control means for controlling energization of said motor for moving said load between said first and second positions, the improvement in said position control means comprising:
   - a control screw means rotatably mounted coaxially with said motor shaft at an end opposite said one end and directly rotated by said motor shaft when said motor is energized;
   - a travel nut threadedly engaged with said control screw means for reciprocably moving along said control screw means as said control screw means rotates;
   - means for constraining said travel nut against sympathetic rotary motion with said control screw means as said control screw means rotates while allowing reciprocal movement in a linear path therealong;
   - a first position detection means proximate said control screw means and actuable by said travel nut for de-energizing said motor when actuated by said travel nut as said operator drives said load to said first position; and
   - a second position detection means proximate said control screw means and actuable by said travel nut for de-energizing said motor when actuated by said travel nut as said operator drives said load to said second position.

2. The operator in claim 1 wherein said control screw means comprises a threaded shaft extension of said motor shaft.

3. The operator in claim 1 wherein said control screw means comprises a threaded rod and a coupler for coaxially coupling said threaded rod to said motor shaft.

4. The operator in claim 1 wherein said first and second position detection means comprise first and second microswitches with respective switch arms disposed in said linear path of movement of said travel nut, said first microswitch for de-energizing said motor when said first switch arm is actuated by said travel nut as said operator drives said load to said first position, said second microswitch for de-energizing said motor when said second switch arm is actuated by said travel nut as said operator drives said load to said second position.

5. The operator in claim 4 wherein said first and second microswitches are mounted for manual, selectable adjustment of said switch arms for setting actuations of said microswitches at predetermined locations during movement of said travel nut along said linear path.

6. The operator in claim 1 wherein said constraining means comprises a rib secured to a housing for said motor and a groove formed in said travel nut cooperating with said rib for slidable movement of said travel nut therealong.

7. The operator in claim 1 wherein said constraining means comprises at least one bearing surface formed on said travel nut in slidable contact with a housing for said motor.

8. In an operator for driving a load, said operator including a drive means connectable to said load for moving said load between a first position and a second position, a selectively energizable motor having a motor shaft coupled at one end to said drive means for actuating said drive means to move said load, and position control means for controlling said motor for moving said load between said first and second positions, the improvement in said position control means comprising:
- a control screw means rotatably mounted coaxially with said motor shaft at an end opposite said one end and directly rotated by said motor shaft when said motor is energized;
- a travel nut threadedly engaged with said control screw means for reciprocably moving along said control screw means as said control screw means rotates;
- means for constraining said travel nut from sympathetic rotary motion with said control screw means as said control screw means rotates while allowing reciprocable movement therealong;
- a multiple-position switch means mounted on said travel nut for reciprocable movement in a linear path therewith, said multiple-position switch means being actuable between a first switch position and a second switch position;
- a first stop means disposed in said linear path of said multiple-position switch means for actuating said multiple-position switch means to said first switch position, thereby de-energizing said motor as said operator drives said load to said first position; and
- a second stop means disposed in said linear path of said multiple-position switch means for actuating said multiple-position switch means to said second switch position, thereby de-energizing said motor as said operator drives said load to said second position.

9. The operator in claim 8 wherein said control screw means comprises a threaded shaft extension of said motor shaft.

10. The operator in claim 8 wherein said control screw means comprises a threaded rod and a coupler for coaxially coupling said threaded rod to said motor shaft.

11. The operator in claim 8 wherein said multiple-position switch means comprises a single-pole, double-throw toggle switch.

12. The operator in claim 11 wherein the first and second stop means are mounted for manual, selectable adjustment for setting actuations of said toggle switch at predetermined locations during movement along said linear path.

13. The operator in claim 8 wherein said constraining means comprises a rib secured to a housing for said motor and a groove formed in said travel nut cooperating with said rib for slidable movement of said travel nut therealong.

14. The operator in claim 8 wherein said constraining means comprises at least one bearing surface formed on said travel nut in slidable contact with a housing for said motor.

15. In an operator for driving a load, said operator including a drive means connectable to said load, a selectively energizable motor having a rotatably mounted field winding housed in a motor casing and a rotor mounted on a motor shaft, said motor shaft being coupled to said drive means for actuating said drive means to move said load, yieldable means for biasing said motor casing against rotation when reaction torque on said motor does not exceed a predetermined magnitude, said yieldable means for allowing rotation of said motor casing when reaction torque on said motor exceeds said predetermined magnitude, and control means actuable upon rotation of said motor casing for controlling the selective energization of said motor, the improvement in said control means comprising:
- a rotation sensor means mounted proximate said motor casing and directly actuable upon rotation of said motor casing in a first direction for controlling the selective energization of said motor; and
- a means pivotally mounted proximate said motor casing and pivotal upon rotation of said motor casing in a second direction for actuating said rotation sensor means.

16. The operator in claim 15 wherein the rotation sensor means comprises a microswitch having a switch arm directly actuable upon rotation of said motor casing in said first direction and wherein said pivotal means comprises a lever pivotal upon rotation of said motor casing in said second direction against said switch arm.

17. An operator for driving a load between a first position and a second position comprising:
- a housing;
- a selectively energizable motor having a motor shaft with a first end and a second end, said motor being mounted in said housing;
- a drive means for connecting said motor shaft at said first end to said load, said load being moved between a first position and a second position when said motor is energized; and
- position control means, including:
  - a) a control screw means rotatably mounted in said housing coaxially with said motor shaft at said second end and directly rotated when said motor is energized;
  - b) a travel nut threadedly engaged with said control screw means;
  - c) means for constraining said travel nut against sympathetic rotary motion while allowing reciprocal movement in a linear path along said control screw means when said control screw means is rotated; and
  - d) position detection means mounted in said housing proximate said control screw means for cooperating with said travel nut during reciprocal movement in said linear path along said control screw means to de-energize said motor as said operator drive said load to one of said first and second positions.

18. The operator in claim 17 wherein said control screw means comprises a threaded shaft extension of said motor shaft.

19. The operator in claim 17 wherein said control screw means comprises a threaded rod and a coupler for coaxially coupling said threaded rod to said motor shaft.

20. The operator in claim 17 wherein said position detection means comprises first and second microswitches mounted in said housing with respective switch arms disposed in said linear path of movement of said travel nut, said first microswitch for de-energizing said motor when said first switch arm is actuated by said travel nut as said operator drives said load to said first position, said second microswitch for de-energizing said motor when said second switch arm is actuated by said travel nut as said operator drives said load to said second position.

21. The operator in claim 20 wherein said first and second microswitches are mounted for manual, selectable adjustment of said switch arms for setting actuations of said microswitches at predetermined locations during movement of said travel nut along said linear path.

22. The operator in claim 17 wherein said position detection means comprises:

a multiple-position switch means mounted on said travel nut for reciprocal movement in a linear path therewith, said multiple-position switch means being actuable between a first switch position and a second switch position; and stop means mounted in said housing in said linear path of said multiple-position switch means for actuating said multiple-position switch means to said first and second switch positions, thereby de-energizing said motor as said operator drives said load to one of said first and second positions, respectively.

23. The operator in claim 22 wherein said multiple-position switch means comprises a single-pole, double-throw toggle switch.

24. The operator in claim 22 wherein said stop means are mounted for manual, selectable adjustment for setting actuations of said toggle switch at predetermined locations along said linear path.

25. The operator in claim 17 wherein said constraining means comprises a rib secured to said housing and a groove formed in said travel nut cooperating with said rib for slidable movement of said travel nut therealong.

26. The operator in claim 17 wherein said constraining means comprises at least one bearing surface formed on said travel nut in slidable contact with said housing.

27. An operator for driving a load comprising:

a housing;

a selectively energizable motor having a rotatably mounted field winding housed in a motor casing and a rotor mounted on a motor shaft, said motor being mounted in said housing;

a drive means for connecting said motor shaft to said load, said load being moved when said motor is energized;

yieldable means mounted in said housing for biasing said motor casing against rotation when reaction torque on said motor does not exceed a predetermined magnitude, said yieldable means for allowing rotation of said motor casing when reaction torque on said motor exceeds said predetermined magnitude; and control means actuable upon rotation of said motor casing for controlling the selective energization of said motor, including:

a) a rotation sensor means mounted in said housing proximate said motor casing and directly actuable upon rotation of said motor casing in a first direction for controlling the selective energization of said motor; and b) a means pivotally mounted in said housing proximate said motor casing and pivotal upon rotation of said motor casing in a second direction for actuating said rotation sensor means.

28. The operator in claim 27 wherein the rotation sensor means comprises a microswitch having a switch arm directly actuable upon rotation of said motor casing in said first direction and wherein said pivotal means comprises a lever pivotal upon rotation of said motor casing in said second direction against said switch arm.

* * * * *